United States Patent
Gao et al.

(10) Patent No.: US 12,031,012 B2
(45) Date of Patent: Jul. 9, 2024

(54) ANTIDEGRADANT COMPOSITION, ANTIDEGRADANT MASTER BATCH AND RUBBER COMPOSITION

(71) Applicant: Sennics Co., Ltd., Shanghai (CN)

(72) Inventors: Yang Gao, Shanghai (CN); Hui Li, Shanghai (CN); Hao Wang, Shanghai (CN)

(73) Assignee: Sennics Co., Ltd., Shanghai (CN)

( * ) Notice: Subject to any disclaimer, the term of this patent is extended or adjusted under 35 U.S.C. 154(b) by 444 days.

(21) Appl. No.: 17/526,965

(22) Filed: Nov. 15, 2021

(65) Prior Publication Data

US 2022/0153964 A1 May 19, 2022

(30) Foreign Application Priority Data

Nov. 17, 2020 (CN) .......................... 202011285308.7

(51) Int. Cl.
| | | |
|---|---|---|
| *C08K 5/3492* | (2006.01) | |
| *B60C 1/00* | (2006.01) | |
| *C08J 3/22* | (2006.01) | |
| *C08K 5/09* | (2006.01) | |
| *C08K 5/18* | (2006.01) | |
| C08L 23/08 | (2006.01) | |
| C08L 91/00 | (2006.01) | |

(52) U.S. Cl.
CPC .......... *C08K 5/3492* (2013.01); *B60C 1/0016* (2013.01); *B60C 1/0025* (2013.01); *C08J 3/22* (2013.01); *C08K 5/09* (2013.01); *C08K 5/18* (2013.01); *C08J 2309/06* (2013.01); *C08J 2323/16* (2013.01); *C08L 23/0853* (2013.01); *C08L 91/00* (2013.01)

(58) Field of Classification Search
CPC . C08K 5/09; C08K 5/3492; C08J 3/22; B60C 1/0016; B60C 1/0025; C08L 23/0853; C08L 91/00
USPC ......................................................... 523/156
See application file for complete search history.

(56) References Cited

U.S. PATENT DOCUMENTS

| 2018/0030244 A1 | 2/2018 | Trimino et al. |
| 2019/0375913 A1 | 12/2019 | Gao et al. |

FOREIGN PATENT DOCUMENTS

| CA | 1340206 C | 12/1998 |
| CN | 103642092 A | 3/2014 |
| EP | 0305190 B1 | 3/1994 |
| EP | 2085135 B1 | 2/2013 |

OTHER PUBLICATIONS

Zhang, Xinmin, "2009 China rubber auxiliary industry technology development report," China Commercial Publishing House, pp. 151-152 (Sep. 30, 2009).
Du, Mengcheng et al., "Qualify control of rubber additive masterbach," Rubber Technology, No. 7, pp. 5-8 (Dec. 31, 2014).
Cataldo, Franco, "A study on the reaction between N-substituted p-phenylenediamines and ozone: experimental results and theoretical aspects in relation to their antiozonant activity," European Polymer Journal, pp. 885-893 (May 31, 2002).
Xing, Jinguo et al., "Preparation and properties of diaryl-p-phenylenediamine antioxidants," Rubber Science and Technology, No. 9, pp. 25-29 (2017).

*Primary Examiner* — Edward J Cain
(74) *Attorney, Agent, or Firm* — Mei & Mark LLP; Manni Li

(57) ABSTRACT

An antidegradant composition, an antidegradant master batch comprising the antidegradant composition and a rubber composition comprising the antidegradant composition or the antidegradant master batch. The antidegradant composition comprises antidegradant TMPPD and one or two selected from antidegradant N3100-B and an antidegradant N3100-C. The antidegradant composition and antidegradant master batch render a rubber compound and a rubber article excellent discoloration resistance, fatigue resistance, ozone resistance, and mechanical properties before and after thermal oxidative aging and enables the rubber compound to be used in the manufacture of all or part of the rubber matrix, especially as a tire sidewall rubber composition and a tire tread rubber composition.

20 Claims, 1 Drawing Sheet

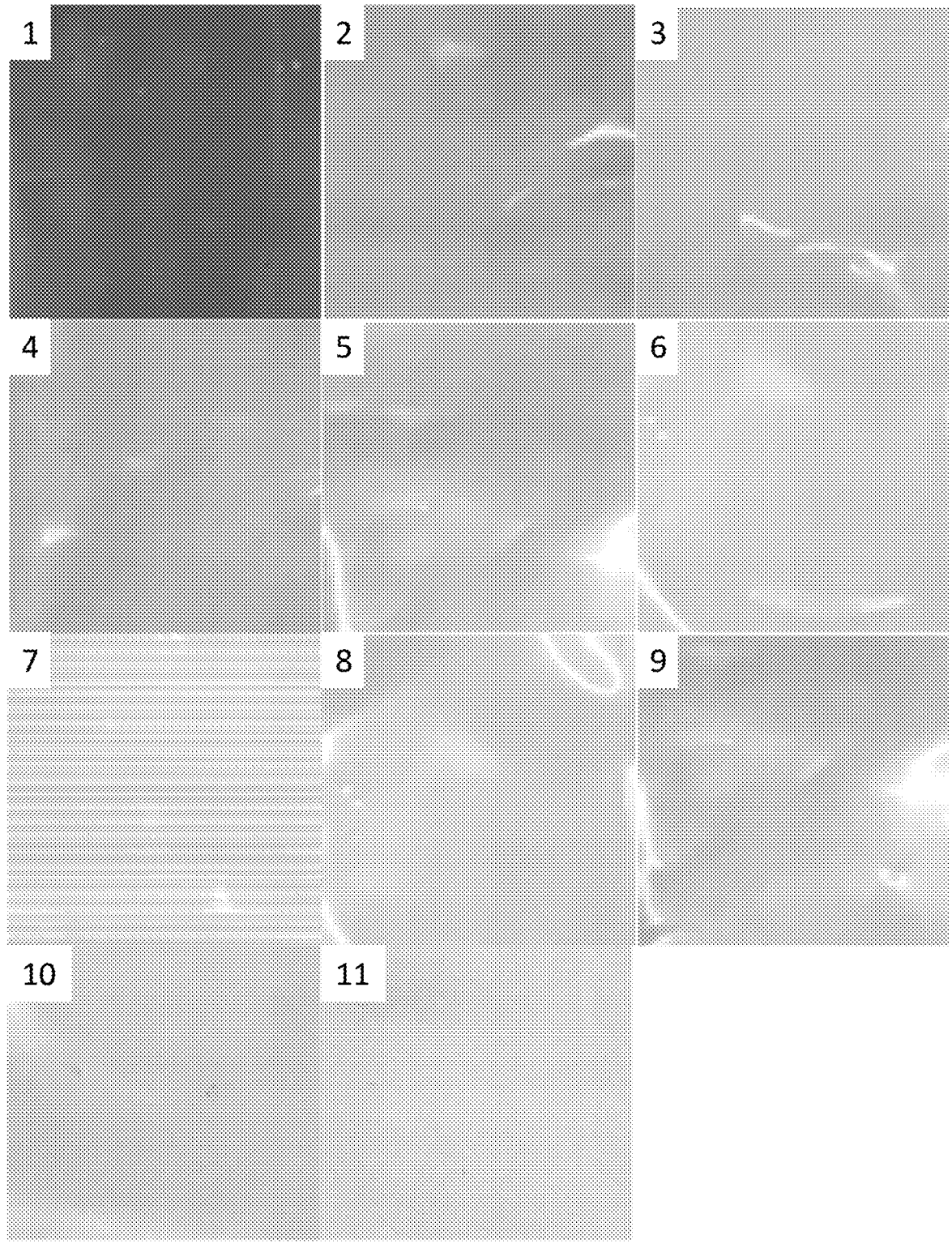

ANTIDEGRADANT COMPOSITION, ANTIDEGRADANT MASTER BATCH AND RUBBER COMPOSITION

CROSS-REFERENCE TO RELATED APPLICATIONS

The subject application claims priority to Chinese Patent Application No. 202011285308.7 filed on Nov. 17, 2020, in China. The Chinese priority application is incorporated herein by reference.

TECHNICAL FIELD

The present invention relates to rubber antidegradant, particularly, antidegradant composition, antidegradant master batch, and rubber composition.

BACKGROUND ART

A tire is an essential component of a car, which plays a role in carrying the weight of the car and transmitting traction and braking force. Generally, tires are visible components exposed to the outside of the car and may change color due to aging effects such as light, high temperature, and chemical corrosion. Therefore, the color of the tire significantly affects the overall appearance of the car.

In addition, due to the continuous rotation of the tire during driving, the rubber material on the tire is compressed and stretched periodically, causing fatigue aging and degrading, or invalidating the performance of the tire.

Thus, chemical or physical antidegradants are usually added to tire compounds during mixing process to improve performance. In the current tire tread and sidewall compounds, p-phenylenediamine antidegradants with good comprehensive performance, such as N,N'-bis(1,4-dimethylpentyl)-p-phenylenediamine (77PD), N-isopropyl-N'-phenyl-p-phenylenediamine (IPPD), N-1,3-dimethylbutyl-N'-phenyl-p-phenylenediamine (6PPD), are usually adopted.

At present, the conventional amine antidegradants have serious discoloration problems, resulting in tire appearance defects. For tires with high requirements for the appearance, phenolic antioxidants or saturated rubbers are adopted to reduce the amount of antidegradants and thus relieve discoloration. Among them, phenolic antioxidants show inferior anti-aging effect compared with amine antidegradants, and use of phenolic antioxidants cause great decrease in heat-oxygen resistance, ozone resistance, and fatigue resistance in a tire. In addition, use of saturated rubbers such as EPDM can improve the appearance with less or no antidegradant, which increases the cost and is not conducive to tire adhesion and molding, as these rubbers are relatively expensive and has poor viscosity. The use of amine or phenolic antioxidants alone cannot fully meet the requirements of various aging performance retentions during the processing and use of a tire.

Moreover, in the current rubber mixing process, the finished products of antidegradant are basically added directly in granular or powder form, and the granular additives will collide with each other or with the container in the flow, resulting in fragmentation and producing a lot of powder. The powder is easy to fly in the air and stay for a long time, and is easy to be inhaled by operators which affect their health. Additionally, in the actual production, the granular additives are fully mixed with rubber only after being added to a mixing device, extrusion, crushing, and melting. The process is long, and the dispersion effect is poor.

Therefore, there is a need in the art for an antidegradant product that maintains good mechanical properties, thermal oxidative aging-resistance, and ozone aging-resistance, and improves discoloration and fatigue resistance of tire compounds.

SUMMARY OF INVENTION

To solve the problem, the present invention provides an antidegradant composition and a master batch comprising the antidegradant composition. The antidegradant composition and antidegradant master batch of the present invention improve discoloration and fatigue resistance of rubber compounds. The antidegradant master batch of the present invention is a pre-dispersion made by mixing antidegradants with rubber. In the subsequent process of preparing a rubber composition, the good compatibility between the antidegradant master batch and the rubber facilitates good dispersion effect, improves dispersion efficiency, and shortens mixing time. Meanwhile, as the antidegradant has been wrapped and fixed by rubber, it is not broken into powder, which reduces environmental pollution during the weighing process. Moreover, compared to directly adding an antidegradant composition comprising the same antidegradants to a rubber, the rubber composition prepared by using the antidegradant master batch of the present invention has better dynamic fatigue performance. The present invention also provides a rubber composition comprising the antidegradant composition or the antidegradant master batch of the present invention, which can be used to manufacture all or part of the rubber matrix of a tire, especially as a tire sidewall rubber composition and a tire tread rubber combination.

Specifically, the present invention provides an antidegradant composition comprising a first component and a second component, wherein the first component is an antidegradant 2,4,6-tri-(N-1,4-dimethylpentyl-p-phenylenediamine)-1,3,5-triazine (also known as TMPPD), and the second component is one or two antidegradants selected from an antidegradant N-phenyl-N'-(2-methylphenyl)p-phenylenediamine (also known as N3100-B) and an antidegradant N-phenyl-N'-(2,6-dimethylphenyl) p-phenylenediamine (also known as N3100-C).

In the antidegradant composition of the present invention, the mass ratio of the first component to the second component is between 1:7 and 7:1.

The present invention also provides an antidegradant master batch comprising the antidegradant composition of the present invention and a diene elastomer. In the antidegradant master batch of the present invention, the weight of the antidegradant composition may account for 70% or more of the total weight of the antidegradant master batch.

In the antidegradant master batch of the present invention, the weight of the diene elastomer may account 20% or less of the total weight of the antidegradant master batch.

In the present invention, the antidegradant master batch may comprise a forming agent, a bonding agent, or both. The forming agent may be ethylene-vinyl acetate copolymer. The weight of the forming agent may account for 5% or less of the total weight of the antidegradant master batch.

In the present invention, the bonding agent may comprise one or two selected from naphthenic oil and stearic acid. The weight of the bonding agent may account for 15% or less of the total weight of the antidegradant master batch.

The present invention also provides a rubber composition comprising the antidegradant composition or the antidegradant master batch of the present invention and a diene elastomer.

In the present invention, the rubber composition may comprise 1.5-5 parts by weight of the antidegradant composition or the antidegradant master batch based on 100 parts by weight of the diene elastomer in the rubber composition.

The present invention also provides a rubber article comprising the rubber composition of the present invention. In the present invention, the rubber article may be a tire.

The present invention further provides a method for using the antidegradant composition or the antidegradant master batch of the present invention to promote dynamic fatigue performance of a rubber composition or a rubber article.

BRIEF DESCRIPTION OF THE DRAWINGS

FIG. 1 shows the images of the bags after the weathering test in Example 3, where the bags numbered 1 to 11 are those in contact with rubber compounds 1 to 11, respectively.

DETAILED DESCRIPTION OF INVENTION

The present invention is further described in connection with the following examples. The examples do not limit the scope of protection for the present invention, and technical features disclosed therein may be modified or combined without departing from the scope of the present invention.

The present invention unexpectedly finds that the use of the combination of an antidegradant TMPPD and an antidegradant N3100-B or N3100-C has a synergistic effect, that is, the combined use of the antidegradant TMPPD (2,4,6-tri-(N-1,4-dimethylpentyl-p-phenylenediamine)-1,3,5-triazine) and at least one selected from the antidegradant N3100-B (N-phenyl-N'-(2-methylphenyl)p-phenylenediamine) and the antidegradant N3100-C(N-phenyl-N'-(2,6-dimethylphenyl) p-phenylenediamine) in the rubber composition render the rubber composition excellent fatigue resistance, discoloration resistance, ozone resistance, and mechanical properties before and after thermal oxidative aging, especially dynamic fatigue resistance.

Compared with using one antidegradant alone, the combined use of TMPPD and at least one selected from N3100-B and N3100-C renders the rubber composition better overall performance, especially excellent fatigue resistance, discoloration resistance, and ozone resistance, especially the significantly improved dynamic fatigue resistance. For example, compared with a rubber composition comprising the antidegradant 6PPD alone, rubber compositions of the present invention comprising the combination of TMPPD and one or two selected from N3100-B and N3100-C have similar mechanical properties before aging, better mechanical properties after thermal and oxygen aging, similar resistance to ozone, significantly improved resistance to discoloration and dynamic fatigue. Compared with a rubber composition comprising TMPPD alone, rubber compositions of the present invention comprising the combination of TMPPD and one or two selected from N3100-B and N3100-C have similar mechanical properties before and after thermal oxidative aging, similar resistance to static ozone, better resistance to dynamic ozone, similar resistance to discoloration and significantly improved resistance to dynamic fatigue. Compared with a rubber composition comprising antidegradant 616 (a butylated p-cresol-dicyclopentadiene copolymer) alone, rubber compositions of the present invention comprising the combination of TMPPD and one or two selected from N3100-B and N3100-C have similar physical properties before and after thermal oxidative aging, better resistance to static ozone and dynamic ozone, similar resistance to discoloration, and significantly improved resistance to dynamic fatigue.

Accordingly, the antidegradant composition of the present invention comprises the antidegradant TMPPD, also referred to as component A herein, and one or two selected from the antidegradant N3100-B and the antidegradant N3100-C, also referred to as component B herein. The total mass of the component A and the component B may be equal to or more than 80%, equal to or more than 90%, equal to or more than 95%, or equal to or more than 99% of the total mass of the antidegradant composition. In some embodiments, the antidegradant composition of the present invention consists of the antidegradant TMPPD and one or two selected from the antidegradant N3100-B and the antidegradant N3100-C.

The structures of TMPPD, N3100-B, and N3100-C are as follows:

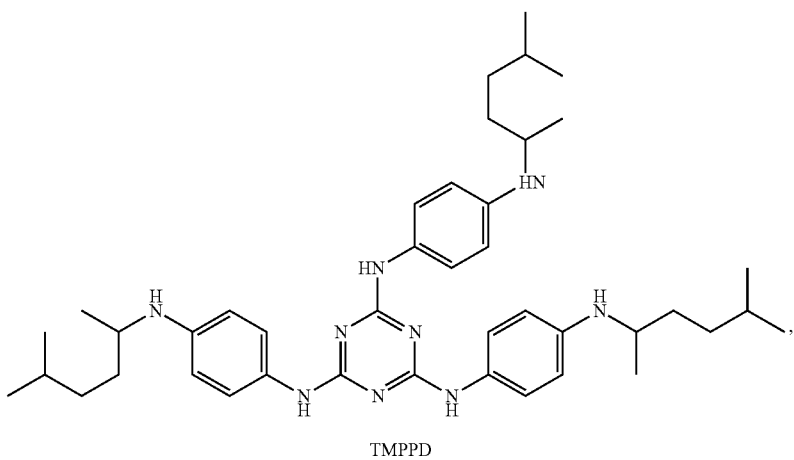

TMPPD

-continued

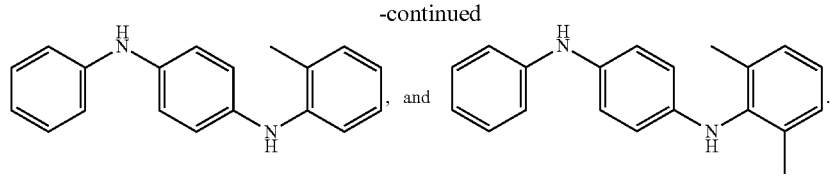

N3100-B, and N3100-C

Generally, in the antidegradant composition of the present invention, the mass ratio of component A to component B is between 1:7 and 7:1, for examples, in any ranges between any two ratios selected from 1:7, 1:6, 1:5, 1:4, 1:3, 1:2, 1:1, 2:1, 3:1, 4:1, 5:1, 6:1, and 7:1.

In the antidegradant composition of the present invention, component B may be N3100-B or N3100-C. Compared with 6PPD, N3100-B and N3100-C have benzene rings connected to the N atoms on both aminos of p-phenylenediamine and have higher steric hindrance and slower migration in rubber, so they are often used to improve long-term protection performance of rubber; in the meantime, the effect of N3100-B or N3100-C on the dynamic fatigue performance of rubber is equivalent to that of 6PPD. The present invention unexpectedly finds that, compared to using only TMPPD or 6PPD, the combined use of TMPPD and at least one selected from N3100-B and N3100-C significantly improves the dynamic fatigue performance of rubber, showing that TMPPD and N3100-B or N3100-C have synergistic effect on improving the dynamic fatigue performance of the rubber.

Compared with directly adding the antidegradant in the rubber, the antidegradant master batch of the present invention provides better compatibility with the rubber, thereby having better dispersion effect, improving the dispersion efficiency, and shortening the mixing time. Meanwhile, since the antidegradant in the antidegradant master batch has been wrapped and fixed by the rubber, it is not broken into powder, which reduces environmental pollution during the weighing process. Moreover, compared to directly adding the antidegradant composition to the rubber, the rubber composition prepared by using the antidegradant master batch of the present invention has better dynamic fatigue performance.

The antidegradant master batch of the present invention comprises the antidegradant composition of the present invention and a diene elastomer. In the antidegradant master batch of the present invention, the total mass of the antidegradant composition usually accounts for equal to or more than 70%, for examples, from 70% to 90%, from 75% to 85%, or 80%, of the total mass of the antidegradant master batch. In the antidegradant master batch of the present invention, the total mass of the diene elastomer usually accounts for equal to or less than 20%, for examples, from 5% to 20%, from 5% to 15%, or 10±2%, of the total mass of the antidegradant master batch.

Herein, a diene elastomer refers to an elastomer with its monomers comprising a diene, for examples, butadiene and isoprene.

Diene elastomers suitable for use in the antidegradant master batch of the present invention may be diene elastomers for rubber compositions that are known in the field, including but not limited to, one or more selected from natural rubber (NR), butadiene rubber (BR), isoprene rubber (IR), ethylene propylene diene monomer (EPDM), styrene butadiene rubber (SBR), chloroprene rubber (CR), nitrile butadiene rubber (NBR), isoprene/butadiene copolymer, isoprene/styrene copolymer, and isoprene/butadiene/styrene copolymer. In some embodiments of the present invention, the diene elastomer in the antidegradant master batch is selected from ethylene propylene diene monomer, styrene butadiene rubber, and isoprene rubber. Examples of ethylene propylene diene monomer include EPDM 505 from Lion Copolymer of the United States and EPDM 4869C from LANXESS Chemical. Examples of styrene butadiene rubber include SBR 1502 from Qilu Petrochemical. Examples of isoprene rubber include the IR products from Maoming Luhua Chemical.

In some embodiments of the present invention, the antidegradant master batch further comprises a forming agent. The forming agent mainly plays the role of forming master batch particle. Generally, in the antidegradant master batch of the present invention, the mass of the forming agent accounts for equal to or less than 5%, for examples, from 0.5% to 5%, from 1% to 5%, or 2±0.5%, of the total mass of the antidegradant master batch. The forming agent suitable for use in the present invention may be ethylene-vinyl acetate copolymer (EVA). Examples of EVA include EVA 260 and EVA 140 from DuPont of the United States.

In some embodiments of the present invention, the antidegradant master batch further comprises a bonding agent. The bonding agent mainly plays the role of promoting material bonding. Generally, in the antidegradant master batch of the present invention, the mass of the forming agent accounts for equal to or less than 15%, for examples, from 2% to 15%, from 5% to 15%, or 8±02%, of the total mass of the antidegradant master batch. The bonding agent suitable for use in the present invention comprises one or two selected from naphthenic oil and stearic acid. When the bonding agent comprises naphthenic oil, the mass of naphthenic oil generally accounts for equal to or less than 10%, for examples, from 2% to 10%, from 4% to 8%, or 6±1%, of the total mass of the antidegradant master batch. When the bonding agent comprises stearic acid, the mass of stearic acid generally accounts for equal to or less than 5%, for examples, from 0.5% to 5%, from 1% to 3%, or 2±0.5%, of the total mass of the antidegradant master batch. In some embodiments, the bonding agent in the antidegradant master batch of the present invention comprises naphthenic oil and stearic acid. In other embodiments, the bonding agent in the antidegradant master batch of the present invention consists of naphthenic oil and stearic acid.

In some embodiments, the antidegradant master batch of the present invention comprises the antidegradant composition of the present invention, a diene elastomer, a forming agent, and a bonding agent. In other embodiments, the antidegradant master batch of the present invention consists of the antidegradant composition of the present invention, the diene elastomer, the forming agent, and the bonding agent.

The antidegradant master batch of the present invention may be prepared by a master batch mixing process. For example, the antidegradant master batch of the present invention may be prepared by mixing the components of the antidegradant master batch evenly and discharging rubber. The starting temperature for the mixing step may be from 50° C. to 70° C., for example, 60±5° C.; the mixing speed may be from 60 rpm to 80 rpm, for example, 70±5 rpm; and the diene elastomer, the forming agent, partial bonding agent, the antidegradant, and the residual bonding agent may be added in sequence during the mixing step. In some embodiments, the preparation process of the antidegradant master batch of the present invention comprises the following steps: the diene elastomer is added and mixed for a period of time (e.g., from 40 seconds to 80 seconds, or 60±5 seconds) under a starting temperature of from 50° C. to 70° C., for examples, 60±5° C., and a mixing speed of from 60 rpm to 80 rpm, for examples, 70±5 rpm. Then, the forming agent is added and mixed for a period of time (e.g., from 20 seconds to 40 seconds, or 30±5 seconds). Subsequently, part of the bonding agent (e.g., stearic acid and ½ of naphthenic oil) is added and mixed evenly; then, the antidegradant and the residual bonding agent (e.g., the remaining ½ of naphthenic oil) are added and mixed evenly. Finally, the antidegradant master batch is obtained and discharged.

The formulation of rubber compositions generally comprises a diene elastomer, an antidegradant, a reinforcing filler, and a crosslinker. In the present invention, rubber compositions comprise unvulcanized rubbers and vulcanized rubbers. Unvulcanized rubbers may be prepared from vulcanized rubbers by vulcanization (curing).

The formulation of rubber compositions of the present invention comprises a diene elastomer, the antidegradant composition or the antidegradant master batch of the present invention, a reinforcing filler, and a crosslinker. Based on 100 parts by weight of the diene elastomer, in the rubber composition, the amount of the reinforcing filler may be 30 to 70 parts by weight, the amount of the antidegradant composition or the antidegradant master batch may be 0.1 to 8 parts by weight, and the amount of the crosslinker may be 0.5 to 3 parts by weight. Herein, unless otherwise specified, part by weight is based on 100 parts by weight of the diene elastomer in the formulation of the rubber composition. Diene elastomers suitable for the rubber composition of the present invention are known in the field, including but not limited to, one or more selected of natural rubber (NR), butadiene rubber (BR), isoprene rubber (IR), ethylene propylene diene monomer (EPDM), styrene butadiene rubber (SBR), chloroprene rubber (CR), nitrile butadiene rubber (NBR), isoprene/butadiene copolymer, isoprene/styrene copolymer, and isoprene/butadiene/styrene copolymer. In some embodiments, in the formulation for the rubber composition of the present invention, the diene elastomer comprises natural rubber and butadiene rubber; in other embodiments, the diene elastomer consists of natural rubber and butadiene rubber. The mass ratio of the natural rubber to the butadiene rubber may be in the ranges of from 1:9 to 9:1, from 2:8 to 8:2, from 3:7 to 7:3, from 4:6 to 6:4, from 4.5:5.5 to 5.5:4.5, or 1:1. Examples of natural rubber include SCR5 from Xishuangbanna Sinochem Rubber Co., Ltd. Examples of butadiene rubber include BR9000 from Qilu Petrochemical.

The formulation of the rubber composition of the present invention is characterized in that the antidegradant therein is the antidegradant composition or the antidegradant master batch of the present invention. Generally, the formulation for the rubber composition of the present invention comprises 0.1 to 8 parts by weight, preferably 1.5 to 5 parts by weight, for examples, 2 to 3.5 parts by weight, 2.2 to 3.3 parts by weight, or 2.4 to 3.13 parts by weight, of the antidegradant composition or the antidegradant master batch. In some embodiments, the formulation for the rubber composition of the present invention comprises 0.1 to 8 parts by weight, preferably 1.5 to 5 parts by weight, for examples, 2 to 3.5 parts by weight, 2.2 to 3.3 parts by weight, 2.4 to 3.2 parts by weight, 2.4 to 3.13 parts by weight, or 2.5 to 3.13 parts by weight, of the antidegradant composition of the present invention. In some embodiments, the formulation for the rubber composition of the present invention comprises 0.1 to 8 parts by weight, preferably 1.5 to 5 parts by weight, for examples, 2 to 3.5 parts by weight, 2.2 to 3.3 parts by weight, 2.2 to 3.0 parts by weight, 2.3 to 2.9 parts by weight, or 2.4 to 2.8 parts by weight, of the antidegradant master batch of the present invention. In the antidegradant composition or the antidegradant master batch in the rubber composition of the present invention, the mass ratio between the component A and the component B are as described above. The present invention finds that when the rubber composition comprises the antidegradant composition or the antidegradant master batch of the present invention, the rubber composition has excellent fatigue resistance, discoloration resistance, ozone resistance, and mechanical properties before and after thermal oxidative aging. Compared to directly added with the antidegradant composition, the rubber composition comprising the antidegradant master batch of the present invention has further improved fatigue resistance. Reinforcing fillers suitable for use in the present invention may be those conventionally used for rubber compositions, including but not limited to, one or more selected from carbon black, titanium oxide, magnesium oxide, calcium carbonate, magnesium carbonate, aluminum hydroxide, magnesium hydroxide, clay, and talc. Generally, the formulation of the rubber composition of the present invention comprises 30 to 70 parts by weight, preferably 40 to 60 parts by weight, more preferably 45 to 55 parts by weight, of a reinforcing filler. In some embodiments of the rubber composition of the present invention, the reinforcing filler is carbon black. In some embodiments, the formulation of the rubber composition of the present invention comprises 30 to 70 parts by weight, preferably 40 to 60 parts by weight, more preferably 45 to 55 parts by weight, for examples 50±2 parts by weight, of carbon black.

In the present invention, the crosslinker may be sulfur (S). Generally, the formulation of the rubber composition comprises 0.5 to 3 parts by weight, preferably 1 to 3 parts by weight, more preferably 1 to 2 parts by weight, of the crosslinker. In some embodiments, the formulation of the rubber composition of the present invention comprises 0.5 to 3 parts by weight, preferably 1 to 3 parts by weight, more preferably 1 to 2 parts by weight, for examples 1.5±0.2 parts by weight or 1.5±0.1 parts by weight, of sulfur.

The formulation of the rubber composition of the present invention may also comprise other components conventionally used in the rubber composition, including but not limited to, one or more of aids and promoters. The amounts of the aids and promoters may be conventionally known in the art.

Aids may include softeners used to improve processability and other properties. Softeners may include petroleum softeners, such as naphthenic oil, aromatic oil, processing oil, lubricating oil, paraffin, liquid paraffin, petroleum asphalt, and vaseline, etc.; fatty oil softeners, such as stearic acid, castor oil, flaxseed oil, rapeseed oil, coconut oil, wax (e.g., beewax, carnauba wax, and lanolin), tall oil, linoleic acid, palmitic acid, and lauric acid, etc.; or both. Aids may also include activators, such as zinc oxide, which may speed up the vulcanization rate and improve the thermal conductivity, wear resistance, and tear resistance of rubber. Generally, aids are used in an amount of 2 to 20 parts by weight per 100 parts by weight of diene elastomer. In some embodiments, the formulation of the rubber composition of the present invention comprises petroleum softeners, such as aromatic oil. The formulation of the rubber composition of the present invention may comprise 0 to 20 parts by weight, preferably 1 to 10 parts by weight, more preferably 2 to 8 parts by weight, such as 5±2 parts by weight or 5±1 parts by weight, of petroleum softeners, such as aromatic oil. In some embodiments, the formulation of the rubber composition of the present invention comprises a fatty oil softener, such as stearic acid. The formulation of the rubber composition of the present invention may comprise 0 to 5 parts by weight, preferably 0.5 to 4 parts by weight, more preferably 1 to 3 parts by weight, for examples 2±0.5 parts by weight or 2±0.2 parts by weight, of a fatty oil softener, such as stearic acid. In some embodiments, the formulation of the rubber composition of the present invention comprises an activator, such as zinc oxide. The formulation of the rubber composition of the present invention may comprise 0 to 10 parts by weight, preferably 2 to 8 parts by weight, more preferably 3 to 7 parts by weight, for examples, 5±1 parts by weight, of an activator, such as zinc oxide. In some embodiments, the formulation of the rubber composition of the present invention comprises a petroleum softener, a fatty oil softener, and an activator. The amounts of the petroleum softener, the fatty oil softener, and the activator are as described above, respectively.

In the present invention, promoters are generally vulcanization accelerators, which may be selected from one or more of sulfonamide, thiazole, thiuram, thiourea, guanidine, dithiocarbamate, aldimine, aldehyde ammonia, imidazoline, and xanthic acid vulcanization accelerators. For example, the promoter may be N-tert-butylbenzothiazole-2-sulphenamide (NS). In some embodiments, the formulation of the rubber composition of the present invention comprises a promoter, such as NS. The formulation of the rubber composition of the present invention may comprise 0 to 1.5 parts by weight, preferably 0.5 to 1.5 parts by weight, more preferably 0.5 to 1.2 parts by weight, for examples 0.8±0.2 parts by weight or 0.8±0.1 parts by weight, of a promoter, such as NS.

In addition, when necessary, a plasticizer may be used in the rubber composition of the present invention, for examples, dimethyl phthalate (DMP), diethyl phthalate (DEP), dibutyl phthalate (DBP), diheptyl phthalate (DHP), dioctyl phthalate (DOP), di-isononyl phthalate (DINP), di-isodecyl phthalate (DIDP), butyl benzyl phthalate (BBP), dilauryl phthalate (DWP), and dicyclohexyl phthalate (DCHP). The plasticizer may be used in a conventional amount that is known in the art.

In some preferred embodiments, the formulation of the rubber composition of the present invention comprises 100 parts by weight of a diene elastomer; 40 to 60 parts by weight, preferably 45 to 55 parts by weight of a reinforcing filler, 1 to 3 parts by weight, preferably 1 to 2 parts by weight of sulfur, 1.5 to 5 parts by weight, preferably 2 to 3.5 parts by weight, more preferably 2.2 to 3.3 parts by weight of an antidegradant, 2 to 8 parts by weight, preferably 3 to 7 parts by weight of an activator, 0.5 to 4 parts by weight, preferably 1 to 3 parts by weight of a fatty oil softener, 1 to 10 parts by weight, preferably 2 to 8 parts by weight of a petroleum softener and 0.5 to 1.5 parts by weight, preferably 0.5 to 1.2 parts by weight of a promoter; wherein the diene elastomer preferably comprises natural rubber and butadiene rubber with a mass ratio of from 4:6 to 6:4, preferably from 4.5:5.5 to 5.5:4.5; the reinforcing filler is preferably carbon black; the antidegradant is the antidegradant composition or the antidegradant master batch of the present invention, preferably the antidegradant master batch of the present invention; the activator is preferably zinc oxide; the fatty oil softener is preferably stearic acid; the petroleum softener is preferably naphthenic oil; and the promoter is preferably NS promoter.

The unvulcanized rubber of the present invention may be prepared by conventional rubber mixing method, such as a two-stage mixing method as follows: in the first stage, an internal mixer is used to mix diene elastomers, reinforcing fillers, aids, and antidegradants, and the rubber discharge temperature is 110° C. or higher, such as 110° C. to 190° C.; in the second stage, an open mill is used to mix the rubber obtained in the first stage with crosslinkers and promoters, and the rubber discharge temperature is 110° C. or lower. Generally, a diene elastomer is added into a thermo-mechanical mixer (such as an internal mixer) at first. After kneading for a while, a reinforcing filler, an aid, and an antidegradant are added to the diene elastomer, and the mixture is kept on being kneaded until the mixture is homogeneous. The reinforcing filler, the aid, and the antidegradant composition may be added in batches. The temperature during kneading is controlled to between 110° C. and 190° C. Then, the mixture is cooled to 100° C. or lower. A crosslinker and a promoter are added to the mixture, and a second kneading is performed during which the temperature is controlled to 110° C. or lower, and an unvulcanized rubber is obtained.

The unvulcanized rubber of the present invention can be vulcanized by conventional vulcanization method to obtain a vulcanized rubber. The vulcanization temperature is generally from 130° C. to 200° C., for examples, from 140° C. to 150° C. or 145±2° C. The vulcanization time depends on the vulcanization temperature, vulcanization system, and vulcanization kinetics, and is generally from 15 minutes to 60 minutes, such as from 25 minutes to 35 minutes or 30±2 minutes. Conventional tablet pressing may be carried out on the kneaded unvulcanized rubber before vulcanization.

In some embodiments, the rubber composition of the present invention is prepared by the following method:

(1) Mixing diene elastomers, reinforcing fillers, aids, and antidegradants uniformly with a thermomechanical mixer, such as an internal mixer, preferably with a rubber discharge temperature of 110° C. or higher, for example from 110° C. to 190° C.; and (2) Mixing the rubber obtained in step (1), vulcanizing agents, and promoters uniformly with a thermomechanical mixer, such as an open mill, preferably with a tablet discharge temperature of 110° C. or lower, to obtain an unvulcanized rubber.

In some embodiments, the method for preparing the rubber composition of the present invention further comprises:

(3) After optionally pressing the unvulcanized rubber, vulcanizing the unvulcanized rubber to obtain a vulcanized rubber. Preferably, the vulcanization temperature is from 130° C. to 200° C., for examples, from 140° C. to 150° C. Preferably, the vulcanization time is from 15 minutes to 60 minutes, for example, from 25 minutes to 35 minutes.

The use of the rubber composition of the present invention in rubber articles, especially rubber tires, may render the rubber articles or rubber tires excellent fatigue resistance, discoloration resistance, ozone resistance, and mechanical properties before and after thermal oxidative aging. Compared with traditional rubber articles comprising the antidegradant 6PPD, the rubber articles (such as tire compounds) comprising the antidegradant composition or the antidegradant master batch of the present invention have comparable mechanical performance and ozone resistance, greatly improved in dynamic fatigue performance, and significantly improved in the degree of discoloration. The use of the antidegradant master batch of the present invention in preparing rubber articles may also reduce dust, improve dispersion, and further enhance the dynamic fatigue performance of rubber articles. Therefore, the present invention further provides use of the antidegradant composition or the antidegradant master batch of the present invention in improving the resistance to dynamic fatigue, resistance to discoloration and/or resistance to ozone aging of rubber compositions or rubber articles. The present invention also provides a rubber article comprising the rubber composition described herein. The rubber article may be a tire, a rubber overshoe, a sealing strip, an acoustic panel, or a crash pad. In some embodiments, the rubber article is a tire rubber composition, for examples, a tread composition, a belt ply composition, and a sidewall composition, of a tire. As a belt ply of a tire, the rubber article may further comprise a reinforcing material conventionally used in the art in addition to the rubber composition of the present invention.

The present invention is illustrated by way of specific examples below. It should be understood that these examples are merely explanatory and is not intended to limit the scope of the present invention. Unless otherwise specified, the methods, reagents, and materials used in the examples are conventional methods, reagents, and materials in the art. The formulations used in the examples are commercially available.

The sources of the materials used in the preparation examples are as follows: Antidegradant TMPPD: Sennics Co., Ltd.; Antidegradant N3100-B: Sennics Co., Ltd.; Antidegradant N3100-C: Sennics Co., Ltd.; Ethylene propylene diene monomer rubber EPDM505: Lion Copolymer, U.S.A; Ethylene propylene diene monomer rubber EPDM4869C: LANXESS Chemical; Styrene butadiene rubber SBR 1502: Qilu Petrochemical; Isoprene rubber: Maoming Luhua Chemical; Ethylene-vinyl acetate copolymer EVA260: DuPont, U.S.A; Ethylene-vinyl acetate copolymer EVA140: DuPont, U.S.A; Naphthenic oil: Petrochina Karamay Petrochemical Co. Ltd; Natural rubber SCR5: Xishuangbanna Sinochem Rubber Co., Ltd.; Butadiene rubber BR9000: Qilu Petrochemical; Carbon black N550: Shanghai Cabot Carbon Black Co. Ltd; ZnO: Yonghua Chemical Technology (Jiangsu) Co., Ltd; SA: Yonghua Chemical Technology (Jiangsu) Co., Ltd; Antidegradant 6PPD: Sennics Co., Ltd; Antidegradant 616: Sennics Co., Ltd; Promoter NS: Sennics Co., Ltd; Sulfur (S): Yonghua Chemical Technology (Jiangsu) Co., Ltd.

Preparation Example 1: Preparation of Antidegradant Master Batch

Formulations of the antidegradant master batches M1-M12 are shown in Table 1, which are prepared as follows: under a starting temperature of 60° C. and a speed of 70 rpm, rubbers (EDPM/SBR/IR) are added, and the ram piston is put down, 60 s later EVA is added and the ram piston is put down, 30 s later stearic acid and ½ of naphthenic oil are added and the ram piston is put down, after the materials are mixed evenly antidegradants (TMPPD/N3100-B/N3100-C) and the remaining ½ of naphthenic oil are added and the ram piston is put down, and after the materials are mixed evenly the obtained antidegradant master batches M1-M12 are discharged and pressed by an open mill.

TABLE 1

Formulation of Antidegradant Master Batch (unit: parts by mass)

| Material | M1 | M2 | M3 | M4 | M5 | M6 | M7 | M8 | M9 | M10 | M11 | M12 |
|---|---|---|---|---|---|---|---|---|---|---|---|---|
| TMPPD | 40 | 40 | 40 | | 10 | 70 | 40 | 40 | 40 | 40 | 20 | 60 |
| N3100-B | | | | | | | 40 | 40 | 40 | 40 | 60 | 20 |
| N3100-C | 40 | 40 | 40 | 80 | 70 | 10 | | | | | | |
| EPDM505 | 10 | | | 10 | 10 | 10 | 10 | | | | 10 | 10 |
| EPDM4896C | | 10 | | | | | | 10 | | | | |
| SBR | | | 10 | | | | | | 10 | | | |
| IR | | | | | | | | | | 10 | | |
| EVA260 | 2 | 2 | 2 | | | | 2 | 2 | 2 | 2 | | |
| EVA140 | | | | 2 | 2 | 2 | | | | | 2 | 2 |
| naphthenic oil | 6 | 6 | 6 | 6 | 6 | 6 | 6 | 6 | 6 | 6 | 6 | 6 |
| stearic acid | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 |

Preparation Example 2: Preparation of Tire Compound

Formulations of the tire compounds 1-11 are shown in Table 2. Preparation process is as follows:

1. Natural rubber SCR5, synthetic glue BR, carbon black N550, ZnO, SA, aromatic oil and antidegradants are added into an internal mixer, and the entire mixture is kneaded until a maximum temperature between 110° C. and 190° C. is reached;

2. The mixture is cooled to 100° C. or lower, then promoter NS and crosslinker S are added to the mixture, and the entire mixture is kneaded until a maximum temperature below 110° C.;

3. The resulting composition is pressed into a film with a thickness of about 2 mm thick to get an unvulcanized rubber film, and its vulcanization characteristics t10 and t90 are measured; and 4. The unvulcanized rubber film is vulcanized for 30 min at 145° C. to obtain a vulcanized film, and its mechanical properties, ozone aging resistance, weathering resistance, and dynamic fatigue aging properties are measured.

TABLE 2

Formulation of Tire Compound (unit: parts by mass)

| Material | 1 | 2 | 3 | 4 | 5 | 6 | 7 | 8 | 9 | 10 | 11 |
|---|---|---|---|---|---|---|---|---|---|---|---|
| SCR5 | 50.0 | 50.0 | 50.0 | 50.0 | 50.0 | 50.0 | 50.0 | 50.0 | 50.0 | 50.0 | 50.0 |
| BR | 50.0 | 50.0 | 50.0 | 50.0 | 50.0 | 50.0 | 50.0 | 50.0 | 50.0 | 50.0 | 50.0 |
| N550 | 50.0 | 50.0 | 50.0 | 50.0 | 50.0 | 50.0 | 50.0 | 50.0 | 50.0 | 50.0 | 50.0 |
| ZnO | 5.0 | 5.0 | 5.0 | 5.0 | 5.0 | 5.0 | 5.0 | 5.0 | 5.0 | 5.0 | 5.0 |
| SA | 2.0 | 2.0 | 2.0 | 2.0 | 2.0 | 2.0 | 2.0 | 2.0 | 2.0 | 2.0 | 2.0 |
| aromatic oil | 5.0 | 5.0 | 5.0 | 5.0 | 5.0 | 5.0 | 5.0 | 5.0 | 5.0 | 5.0 | 5.0 |
| 6PPD | 2.5 | | | | | | | | | | |
| TMPPD | | 2.5 | | | | | | | | 1.4 | 0.3 |
| 616 | | | 2.5 | | | | | | | | |
| N3100-C | | | | | | | | | | 1.4 | 2.1 |
| M1 | | | | 3.5 | | | | | | | |
| M5 | | | | | 3.0 | 2.5 | | | | | |
| M9 | | | | | | | 3.13 | | | | |
| M11 | | | | | | | | 3.13 | 2.5 | | |
| NS | 0.8 | 0.8 | 0.8 | 0.8 | 0.8 | 0.8 | 0.8 | 0.8 | 0.8 | 0.8 | 0.8 |
| S | 1.5 | 1.5 | 1.5 | 1.5 | 1.5 | 1.5 | 1.5 | 1.5 | 1.5 | 1.5 | 1.5 |
| Total | 166.8 | 166.8 | 166.8 | 167.8 | 167.3 | 166.8 | 167.4 | 167.4 | 166.8 | 167.1 | 166.7 |

Testing Example 1: Basic Physical Performance

The vulcanization characteristics t10 and t90 and the mechanical properties before and after aging of the tire compounds 1-11 are measured according to the following standards, and the results are shown in Table 3:

Vulcanization Characteristics: GB/T 16584-1996, Rubber—Measurement of vulcanization characteristics with rotorless curemeters;

Elongation at break and tensile strength before aging: GB/T 528-2009, Rubber, vulcanized or thermoplastic—Determination of tensile stress-strain properties;

Tensile strength and elongation at break after aging under 100° C. x48H: GB-T 3512-2014, Rubber, vulcanized or thermoplastic—Accelerated ageing and heat resistance tests—Air-oven method.

TABLE 3

Basic Physical Performance of Tire Compound

| Compound No. | 1 | 2 | 3 | 4 | 5 | 6 | 7 | 8 | 9 | 10 | 11 |
|---|---|---|---|---|---|---|---|---|---|---|---|
| t10 | 8.99 | 10.22 | 9.23 | 9.63 | 9.64 | 9.56 | 9.64 | 9.62 | 9.65 | 9.58 | 9.50 |
| t90 | 16.69 | 17.71 | 17.36 | 17.45 | 17.26 | 16.88 | 17.53 | 17.38 | 16.98 | 17.31 | 17.23 |
| Elongation at break before aging (%) | 547.5 | 622.0 | 563.1 | 567.2 | 601.6 | 598.5 | 556.9 | 585.4 | 555.2 | 558.3 | 566.2 |
| Tensile strength before aging (MPa) | 18.7 | 19.2 | 18.8 | 18.8 | 19.9 | 18.5 | 18.9 | 19.3 | 19.1 | 18.3 | 18.2 |
| Elongation at break after aging under 100° C. × 48 H (%) | 407.8 | 476.1 | 448.8 | 462.0 | 443.4 | 425.3 | 445.6 | 456.0 | 443.5 | 463.6 | 450.3 |
| tensile strength after aging under 100° C. × 48 H (MPa) | 16.5 | 17.4 | 16.9 | 16.4 | 17.1 | 16.3 | 16.7 | 17.1 | 16.5 | 16.1 | 16.8 |

Testing Example 2: Ozone Aging Testing

Ozone resistance of tire compound is tested in an ozone aging test chamber according to ISO 1431-1:2004, Rubber, Vulcanized or Thermoplastic—Resistance to Ozone Cracking. Concentration by volume of ozone is 50 pphm, temperature is (40±2°) C., and humidity is (60±5)%.

Static ozone resistance testing is conducted according to GB/T 7762-2014, Rubber, Vulcanized or Thermoplastic—Resistance to Ozone Cracking—Static Strain Testing. In the static testing, the elongation is 20% and the testing is run continuously for 90 hours. Samples are observed for cracking, and the results are shown in Table 4:

Dynamic ozone resistance testing is conducted according to GB/T 13642-2015, Rubber, Vulcanized or Thermoplastic—Resistance to Ozone Cracking—Dynamic Strain Testing. In the dynamic testing, the elongation is 10%, the frequency is 0.5 Hz, and the testing is run continuously for 60 hours. Samples are observed for cracking, and the results are shown in Table 5, and the grades of ozone crack are described in Table 6.

TABLE 4

| Static Testing Result | | | | | | | | | | | |
|---|---|---|---|---|---|---|---|---|---|---|---|
| Compound No. | 1 | 2 | 3 | 4 | 5 | 6 | 7 | 8 | 9 | 10 | 11 |
| Crack grade | 1 | 0 | 3 | 1 | 1 | 1 | 1 | 1 | 1 | 1 | 1 |

TABLE 5

| Dynamic Testing Result | | | | | | | | | | | |
|---|---|---|---|---|---|---|---|---|---|---|---|
| Compound No. | 1 | 2 | 3 | 4 | 5 | 6 | 7 | 8 | 9 | 10 | 11 |
| Crack grade | 1 | 4 | 3 | 1 | 1 | 1 | 1 | 1 | 1 | 1 | 1 |

TABLE 6

| Grade Description for Ozone Crack | |
|---|---|
| Grade | Description |
| 0 | No crack |
| 1 | Crack width < 0.1 mm |
| 2 | 0.1 mm ≤ Crack width < 0.2 mm |
| 3 | 0.2 mm ≤ Crack width < 0.4 mm |
| 4 | Crack width ≥ 0.4 mm |

Example 3: Weathering Testing

The vulcanized rubber films are packed into Ziplock bags, and the rubber films are pressed against the bags. Color changes of the bags are observed every 7 days after the bags are exposed to outdoor, and the exposure is conducted for 49 days in total. The color change of the bags are observed and photographed, and the color data of the bags are measured with a colorimeter and recorded. The results are shown in Table 7 and FIG. 1. The description of weathering discoloration grade is shown in Table 8.

TABLE 7

| Weathering Testing Result | | | | | | | | | | | | |
|---|---|---|---|---|---|---|---|---|---|---|---|---|
| Compound No. | | 1 | 2 | 3 | 4 | 5 | 6 | 7 | 8 | 9 | 10 | 11 |
| Discoloration grade | | 4 | 1 | 0 | 1 | 1 | 1 | 1 | 1 | 1 | 1 | 1 |
| Data of colorimeter | $L^*$ | 67.12 | 83.28 | 88.64 | 76.34 | 79.56 | 82.15 | 78.15 | 80.23 | 81.25 | 75.28 | 72.12 |
| | $a^*$ | 5.68 | 0.8 | 0.32 | 0.68 | 0.65 | 0.32 | 0.67 | 0.56 | 0.43 | 0.66 | 0.45 |
| | $b^*$ | 25.01 | 1.67 | 0.56 | 0.98 | 0.74 | 0.56 | 0.86 | 0.78 | 0.66 | 1.02 | 2.36 |

TABLE 8

| Description of Discoloration Grade | |
|---|---|
| Grade | Description |
| 0 | No color change |
| 1 | Slight discoloration of small area, which can be found only by careful comparison |
| 2 | Slight discoloration of large or all area, which can be easily found after comparison |
| 3 | Serious discoloration of small area, which can be directly found |
| 4 | Serious discoloration of large or all area, which can be directly found |

Testing Example 4: Dynamic Fatigue Aging Testing

Dynamic fatigue aging testing is conducted according to GB/T 1688-2008, Rubber, vulcanized—Determination of tension fatigue, and the results are shown in Table 9.

TABLE 9

| Results of Dynamic Fatigue Aging Test | | | | | | | | | | | |
|---|---|---|---|---|---|---|---|---|---|---|---|
| Compound No. | 1 | 2 | 3 | 4 | 5 | 6 | 7 | 8 | 9 | 10 | 11 |
| Times at breaking (10000 times) | 279 | 160 | 122 | 811 | 802 | 615 | 768 | 813 | 732 | 659 | 624 |

As can be seen from Examples 1-2 and Testing Examples 1-4, the mechanical properties before aging of the tire compounds comprising a combination of an antidegradant TMPPD and N3100-B or N3100-C are close to that of the reference sample comprising only 6PPD, TMPPD or 616, the ozone resistance of the tire compounds comprising the combination of the antidegradant TMPPD and N3100-B or N3100-C is comparable to that of the reference sample comprising antidegradant 6PPD, and dynamic ozone resistance of the tire compounds comprising the combination of the antidegradant TMPPD and N3100-B or N3100-C is significantly better than that of the reference sample comprising only an antidegradant TMMPD or 616, the degree of discoloration after the weathering test of the tire compounds comprising the combination of the antidegradant TMPPD and N3100-B or N3100-C is significantly improved compared with that of the reference sample comprising only the antidegradant 6PPD, and the dynamic fatigue resistance of the tire compounds comprising the combination of the antidegradant TMPPD and N3100-B or N3100-C is significantly better than that of the reference sample of comprising only the antidegradant 6PPD, TMPPD or 616.

In addition, the dynamic fatigue resistance of the tire compounds comprising an antidegradant master batch containing an antidegradant TMPPD and N3100-C is significantly better than that of the tire compounds directly added with antidegradant TMPPD and N3100-C. Rubber compounds 4 and 10 contain the same amount of the antidegradant TMPPD and N3100-C. The antidegradants are added in the form of an antidegradant master batch to the rubber compound 4, but added directly to the rubber compound 10. The results show that the dynamic fatigue resistance of the rubber compound 4 is significantly better than that of the rubber compound 10. Rubber compounds 5 and 11 contain the same amount of the antidegradant TMPPD and N3100-C. The antidegradants are added in the form of the antidegradant master batch to the rubber compound 5, but added directly to the rubber compound 11. The results show that the dynamic fatigue resistance of the rubber compound 5 is significantly better than that of the rubber compound 11.

We claim:

1. An antidegradant composition, comprising
a first component, wherein the first component is 2,4,6-tri-(N-1,4-dimethylpentyl-p-phenylenediamine)-1,3,5-triazine (TMPPD), and
a second component, wherein the second component is N-phenyl-N'-(2-methylphenyl) p-phenylenediamine (N3100-B), N-phenyl-N'-(2,6-dimethylphenyl) p-phenylenediamine (N3100-C), or both.

2. The antidegradant composition of claim 1, wherein a mass ratio of the first component to the second component is between 1:7 and 7:1.

3. An antidegradant master batch according to claim 1, comprising
the antidegradant composition of claim 1, and
a diene elastomer.

4. The antidegradant master batch of claim 3, wherein weight of the antidegradant composition is equal to or more than 70% of a total weight of the antidegradant master batch.

5. The antidegradant master batch of claim 3, wherein the weight of the diene elastomer is equal to or less than 20% of a total weight of the antidegradant master batch.

6. The antidegradant master batch of claim 3, further comprising a forming agent, a bonding agent, or both.

7. The antidegradant master batch of claim 6, wherein the forming agent is an ethylene-vinyl acetate copolymer.

8. The antidegradant master batch of claim 6, wherein weight of the forming agent is equal to or less than 5% of a total weight of the antidegradant master batch.

9. The antidegradant master batch of claim 6, wherein the bonding agent comprises one or two selected from naphthenic oil and stearic acid.

10. The antidegradant master batch of claim 6, wherein weight of the bonding agent is equal to or less than 15% of a total weight of the antidegradant master batch.

11. A rubber composition according to claim 1, comprising
the antidegradant composition according to claim 1, and a diene elastomer.

12. The rubber composition of claim 11, wherein the rubber composition comprises 1.5-5 parts by weight of the antidegradant composition based on 100 parts by weight of the diene elastomer in the rubber composition.

13. A rubber article according to claim 11, comprising the rubber composition according to claim 11.

14. The rubber article of claim 13, wherein the rubber article is a tire.

15. A method for improving dynamic fatigue performance of a rubber composition or a rubber article according to claim 1, comprising
applying the antidegradant composition of claim 1 to a rubber composition or a rubber article.

16. A rubber composition according to claim 3, comprising
the antidegradant master batch according to claim 3, and a diene elastomer.

17. The rubber composition of claim 16, wherein the rubber composition comprises 1.5-5 parts by weight of the antidegradant master batch based on 100 parts by weight of the diene elastomer in the rubber composition.

18. A rubber article according to claim 16, comprising the rubber composition according to claim 16.

19. The rubber article of claim 18, wherein the rubber article is a tire.

20. A method for improving dynamic fatigue performance of a rubber composition or a rubber article according to claim 3, comprising
applying the antidegradant master batch of claim 3 to a rubber composition or a rubber article.

* * * * *